July 25, 1944.  S. KIESSKALT  2,354,383
PROCESS OF ADSORBING GASES AND VAPORS
Filed Oct. 8, 1940
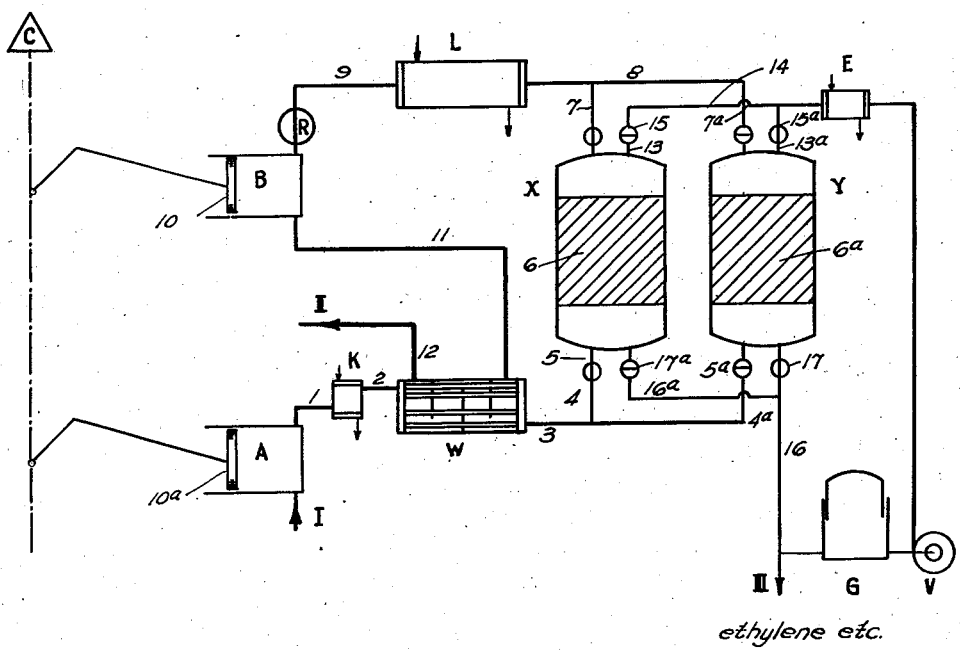
Siegfried Kiesskalt
INVENTOR
BY
HIS ATTORNEYS Patented July 25, 1944

2,354,383

UNITED STATES PATENT OFFICE 2,354,383

PROCESS OF ADSORBING GASES AND VAPORS

Siegfried Kiesskalt, Frankfort-on-the-Main, Germany; vested in the Alien Property Custodian Application October 8, 1940, Serial No. 360,291
In Germany October 28, 1939

1 Claim. (Cl. 183—114.2)

The present invention relates to a process of adsorbing gases and vapors.

Spacious plants are necesary for separating relatively small amounts of a particular gas from large quantities of mixtures containing the same by adsorption by means of active carbon or silica gel, for instance, for obtaining 2 per cent of ethylene from coke oven gas, without extracting the main portion of the gases. In consequence thereof said plants operate with relatively large losses of energy. The adsorption of higher amounts of gases by cooling processes is not only uneconomical because of the energy wasted, but also because they require prolonged change-over-periods. If, on the other hand, the main gas portion, which often comprises 98 percent of the total gas portion, is not required for use in the compressed state, the application of pressure for facilitating the adsorption would entail unreasonably high compression costs.

Now I have found that the afore-named disadvantages may be avoided by extracting gases and vapors from mixtures containing the same under pressure and at a low temperature within a cold gas machine, by compressing the gaseous mixture, cooling it, by utilizing a previously treated gas mixture, chilled by expansion, leading the cooled and compressed gas into adsorbers containing active carbon or silica gel, expanding the non-adsorbed components leaving the adsorbers so as to chill the same and employing such chilled gas for cooling another batch of the incoming initial mixture. According to the invention, the coupling of the adsorbers with a cold gas system (cf. Schüle, "Technische Thermodynamik," 4th edition, volume 1, pages 171 et seq.) not only allows easy cooling of the gas and vapor entering the plant, but, by using an expansion engine, makes it possible to cool the apparatus in a very simple and favorable manner, from an economical point of view, while a large portion of the energy expended in the compression is utilized.

The invention is diagrammatically illustrated, by way of example, in the accompanying drawing to which reference is now made.

The system illustrated in the drawing comprises a compressor A having a gas inlet I and a gas outlet 1 and provided with a piston 10a for effecting the compression of the gas mixture. Gas outlet 1 is connected to a water condenser K which is in turn connected through line 2 to a heat exchanger W. Heat exchanger W is provided with a cooling gas inlet line 11 and a cooling gas outlet line 12. Heat exchanger W is connected through lines 3, 4 and 4a to the bottom of adsorbers X and Y, which are loaded with a solid adsorbent 6 and 6a, which may be active carbon or silica gel. The adsorbers X and Y are alternately in communication with line 3 through valves 5 and 5a. Thus when adsorber X is cut in by opening valve 5, adsorber Y is cut out by closing valve 5a. The adsorbers X and Y are provided with outlet valve-controlled lines 7 and 7a for the non-adsorbed gas, which are in turn connected to line 8, which discharges into cooler L. Cooler L is connected by line 9 and regulator R to the expansion engine B. In the expansion engine, the non-adsorbed gases expand against the force of piston 10. A line 11 leads from the expansion engine B to the heat exchanger W to permit the conduction to the latter of the gases chilled by expansion in engine B.

G represents a gasometer which may be utilized to store the gases adsorbed in adsorbing towers X and Y. For the conduction of the gas from these towers to the gasometer, outlets 13 and 13a controlled by valves 15 and 15a are provided at the top of said towers. These outlets are connected through line 14 and heater E to the gasometer. In order to insure a complete removal of the adsorbed gases from the adsorption towers and a complete regeneration of the adsorbing agent, blower V is provided by which gas may be circulated from the gasometer through the towers and back to the gasometer. The gases may be discharged from the system by way of line III.

More energy is consumed in the system by compressor A than is furnished by the expansion device B. In order to compensate for these differences in energy, it is preferable to couple compressor B with A through suitable devices (not specifically disclosed) to an electric motor or other power engine C by which A and B are driven.

The operation of said system is as follows: Assuming that adsorber Y has been cut out of the system and is being regenerated and that adsorber X has been cut in the system, the gas to be treated enters the plant through conduit I and is compressed by compressor A, for instance, to 4 atmospheres above atmospheric pressure. The heat of compression is eliminated by cooling water in condenser K. The total quantity of gas then enters the heat-exchanger W where it is cooled in counter-current by the gas discharged from the expansion engine B. The cooled and compressed gas is then passed to the adsorber X which is charged, for instance, with active carbon. In X the heavy hydrocarbons are adsorbed.

Owing to the pressure applied and the low temperature of the gas, the quantities of gases adsorbed are by far greater than in the usual adsorption plants. The gas i. e., coke oven gas freed from heavy constituents, for instance, from ethylene and other heavy hydrocarbons, is cooled in a water cooler L and then expanded to about normal pressure in an expansion device B. As the expansion is effected adiabatically, a considerable temperature drop in the expanded gas is produced. The gas so chilled is utilized for the adsorption process by conducting the discharged gas through heat exchanger W in counter-current to the compressed initial gas and causing it to leave the apparatus at II.

After the adsorber X has been completely charged, the main current of gas is directed manually or automatically to the regenerated adsorber Y and the heavy hydrocarbons which have been separated are expelled from X. The latter operation may be performed first by releasing the pressure on adsorber X by manipulation of the valve 15 to permit the adsorption gases to expand into the gasometer G. If it is intended to completely remove the adsorbed gases, heavy hydrocarbons already obtained and contained in the gasometer, may be circulated by means of blast V through the adsorber X by way of lines 16, 16a, 14 and heating device E. The adsorber cooled by the expansion is thus heated until the discharge is complete. This stage of the operation is illustrated in the drawing by the second adsorbing device Y which must be actuated in alternation with the adsorber X. In many cases it will be advisable to use a third adsorber which after the removal of the ethylene is cold-blasted with the cooled gas leaving the apparatus at II.

The ethylene thus obtained and the heavy hydrocarbons are eliminated from the apparatus at III. They may be introduced into a plant for liquefaction if desired. In order to save the step of compression in this case it is preferable to insert a compressor between the adsorber and the liquefaction plant, while avoiding the gasometer G.

It may in some cases be advisable to have the expansion machine B expanded to a pressure higher than atmospheric pressure, for instance to maintain the gases under a pressure necessary for feeding a long distance gas pipe system or for carrying out any other subsequent process. Depending on the size of the plant and the operating conditions chosen, compressor A, expansion machine B and additional power engine C may be reciprocating engines, turbo-engines with mechanical, hydraulic or electric intermediate gears; C may be a steam engine, an electromotor or a gas power engine.

As compared to the steam regeneration method usual in the adsorption procedures, the process of the present invention has the advantage of saving steam and, above all, of excellently protecting the adsorbing agent, particularly if it be active carbon. The number of the adsorption towers required can in general be reduced. The present process may be used for the separation of coke oven gas or the like as well as for the separation of small percentages of reacted gases or vapors from mixtures obtained in catalytic processes using a circulating gas.

The economical value of the present process is due essentially to the fact that it does not produce any unnecessarily low temperatures by the application of unnecessarily high pressures. It must, therefore, be endeavoured to correlate a low operating pressure in the cycle with a low temperature for the cooling water. According to the invention this is performed by the application of a means known to the art for adjusting the flow of the gases into the expansion machine, said means being mounted adjacent to the expansion machine and represented in the drawing by R. The fluctuations of the temperature of the cooling water occurring during the prolonged operations could be regulated manually. But in the course of an operation, fluctuations in the cold cycle likewise occur due to the fact that either the heat exchanger was just thawed out or a change-over was made to a regenerated, heated adsorber. These fluctuations of temperature, too, may suitably be compensated by a temporary alteration of the operating pressure. The regulation of flow of gas to the expansion machine will, therefore, have to be made dependent on the temperature of the gas introduced after having passed the heat exchanger and before the adsorption sets in, the operation being performed in such a manner that with a decreasing temperature of the gas which means a decreasing temperature of the cooling water, the pressure is decreased, or in other words, the flow of gases to the expansion machine is increased and vice versa.

Many of the components to be obtained and present only in traces, such as ethylene, propylene and others, are so intimately adsorbed by the adsorbing agent that, by releasing the pressure on the adsorbent, the adsorbed, heavy constituents are set free, not at once, but only after a prolonged time. Therefore, it will not be advisable in such cases, to release the pressure on the adsorbent which has been taken out of the pressure cycle by permitting expansion of the adsorbed gases into the gasometer, since large portions of inert gases, for instance, methane or hydrogen, would dilute the substances desired and impair the further treatment. After the charged adsorber has been taken out of the pressure cycle, the gases confined therein will, therefore, be expanded into the gas leaving the plant which is not under pressure and has been freed from the heavy constituents. Only after the expansion, pure heated gas or a gas enriched with heavy constituents is blown from the gasometer through the adsorber in order to regenerate it entirely. If the removed substances constitute a mixture, for instance ethylene and propylene or gas oil, i. e., a mixture of heavy hydrocarbons, it may often be preferable to use heated pure ethylene for regenerating the adsorbing agent, thereby expelling to a large extent the heavier components. In such an event that gas will be used for the removal which is least adsorbed at the increased temperature of regeneration and, above all, tends least to produce undesired phenomena, such as polymerization on the adsorbing agent and the like. For a careful treatment of the adsorbing agent it may furthermore be advisable to steam it once in known manner after each thirtieth or fiftieth regeneration so as to remove entirely the residual charge with agents injuring the adsorption.

The present process makes it possible to separate 1.5 per cent of ethylene from illuminating gas. The treatment of the entire quantity of gas according to the present invention shows surprising results. By means of pressures easily attained mechanically, for instance 4 atmospheres above atmospheric pressure, and suitable active carbons which are selectively adsorbent for ethylene up to about ten times the normal quantities of gases may be adsorbed. The regeneration thus becomes economical and simple, since in the case of components of small percentages to be obtained and the small additional charges, the energy lost on changing becomes too large in the usual processes.

I claim:

In a process of recovering by adsorption gases and vapors from a mixture of gases and vapors which comprises, compressing the mixture, cooling the mixture under pressure by heat exchange with cold products from the process, passing the thus cooled mixture while under pressure through an adsorption zone and therein contacting the same with a selective adsorbent for the gases and vapors sought to be recovered, expanding the non-adsorbed gases and vapors with external work and passing the expanded gases and vapors in heat exchange relationship with said compressed mixture flowing to said adsorption zone in the cooling step specified; the improvement which comprises, maintaining the temperature of said compressed mixture entering said adsorption zone substantially uniform by varying the pressure maintained on the non-adsorbed gases and vapors supplied to said expansion step in direct ratio with any variations in the temperature of said compressed mixture leaving the cooling step specified.

SIEGFRIED KIESSKALT.